3,124,229
HOPPER FOR SILO CHUTE
Donald E. Rutten, Division St., Plainfield, Ill.
Filed July 2, 1962, Ser. No. 206,901
8 Claims. (Cl. 193—2)

This invention relates to a new and improved adjustable hopper for silo chutes.

Silos, used by farmers to store silage for the feeding of livestock are usually equipped with a vertical chute along the outside thereof through which silage from the interior is discharged. The present invention is concerned with a discharge hopper or spout for the bottom of a vertical silo chute to direct silage to desired locations.

The instant invention is further directed to an improvement over my copending application entitled Silo Chute Hopper, having Serial Number 96,756, filed March 20, 1961, now Patent No. 3,061,063.

A principal object of the present invention is to provide a hopper capable of being adjusted for various sizes of silo chutes.

Another important object of this invention is the provision of a chute hopper comprising cooperative parts for joining in various adjusted relationships to effect various sizes of hoppers for operation with various sizes of silo chutes.

Still another important object of this invention is to supply silo chute hoppers having cooperative sides and fronts for adjustment in various relationships and including intermediately disposed adjustable size back members.

Another and still further important object of this invention is to equip a multi-part silo chute hopper with various cooperative parts having multiple holes therein to effect joining of the several cooperative parts in any one of several combinations of adjustment to effectively provide a hopper capable of association with various sizes of silo discharging chutes.

Another object as set forth in the preceding paragraphs in which the holes for joining the cooperative parts together radiate upwardly and outwardly from a common juncture point at the bottom of the hopper whereby the chute attaching end of the hopper may be adjusted throughout a wide range for attachment to chute of various sizes and wherein the discharge bottom portion of the hopper remains substantially the same regardless of the adjustment of the upper chute attaching side of the hopper.

Still another important object of this invention is to provide means for swingably attaching an adjustable hopper to the bottom end of a vertical silo chute.

A still further important object of this invention is to equip an adjustable hopper for silo chutes with pulley means for swingably joining the hopper with a vertically disposed silo chute to alternately use the hopper for deflecting silage as desired or to entirely remove the hopper from the underside of the chute to permit personnel to enter the bottom end of the discharging silo chute.

Other and further important objects and advantages will become apparent from the disclosures in the following specification and accompanying drawings.

In the drawings:

FIGURE 1 is a vertical sectional view taken through a farm silo used for storing silage to be used for livestock feed throughout the non-growing season.

FIGURE 2 is an enlarged view, partially in section, of the discharge hopper of the silo as shown in FIGURE 1.

FIGURE 3 is a top plan view of the adjustable size hopper of this invention.

FIGURE 4 is an isometric view of the adjustable size hopper as shown in FIGURE 3.

FIGURE 5 is an elevational view of the rear face of the adjustable hopper with the rear face adjusted for normal or medium size top opening of the hopper.

FIGURE 6 is a view similar to FIGURE 5 with the rear face members expanded to their maximum extent to produce a large hopper opening.

FIGURE 7 is another elevational view of the rear face of the adjustable hopper such as shown in FIGURES 5 and 6, but with the rear face parts arranged in maximum overlapped relationship to produce a small hopper opening.

As shown in the drawings:

The reference numeral 10 indicates generally a cylindrically shaped silo within which a farmer stores his ensilage during the growing season and then removes the silage from the silo to feed his livestock. The silage is indicated by the reference numeral 11 in FIGURE 1. A combination filling and discharge chute 12 is mounted along the side of the silo 10 and provides a passageway through which silage is removed from the silo. The vertical chute 12 is generally semi-cylindrical in shape and is located adjacent a series of passageways 13 through which the silage 11 is passed for discharge through the chute 12. Below the level of the silage 11 the passageways 13 are equipped with doors or closure members 14 to thereupon hold the silage within the silo 10. In order to discharge or remove silage from the silo the closure member 14 located at the approximate level of the silage within the silo is removed. Thereafter the silage may be passed through the opening 13 and thence down the chute 12.

The bottom of the chute 12 is equipped with a silage directing hopper 15 such as shown in my copending application on Silo Chute Hopper, Serial Number 96,756. The hopper 15, located at, and attached to, the bottom of the chute 12 is utilized to deflect or direct silage away from the side of the silo 10 and into a receptacle such as a wagon or box or into a laterally disposed trough-like conveyor 16 for delivery of the silage to some remote station. The silage directing hopper 15 is mounted onto the lower end of the chute 12 by means of spaced apart side arms 17 and 18. The arms 17 and 18 are rigidly fastened to the sides of the hopper 15 by bolts or rivets or the like 19 and 20 respectively. The arms 17 and 18 are thus a unitary part of the hopper. The upper ends of the arms are pivotally mounted to opposite sides of the chute 12 as shown at 21 and 22 respectively. As in my copending application the arms 17 and 18 are sufficiently long and their pivotal mountings 21 and 22 positioned such that the hopper 15 may be swung out from the bottom of the chute 12 to permit access to the chute by personnel who might be attending the silo. An eyebolt 23 is provided on the lower front side of the hopper 15 and has a rope member 24 fastened thereto which extends upwardly along the front side of the chute 12 and thereupon passes through a pulley 25 fixedly carried on the front of the chute and thence downwardly as shown at 26 so that an operator upon pulling the rope may cause the hopper 15 to swing outwardly and upwardly from its position beneath the chute 12 about the opposed hinges 21 and 22 as shown in dashed lines in FIGURE 2. In the dash line position of the hopper as shown in FIGURE 2 the bottom of the silo chute 12 is completely unobstructed and personnel may have easy access to the chute for climbing up to a position within the silo 10.

Silo chutes 12 are made of many different sizes and as stated above it is an object of the present invention to provide hopper means capable of adjustment for all sizes of silo chutes. The discharge end of the hopper 15 should remain a constant size because the silage delivered therethrough is directed to the same receiving trough or receptacle. It is thus only the upper end of the hopper which must have its size changed in order to permit the hopper to be accommodated to various sizes of silo chutes.

March 10, 1964   C. BUSTAMANTE   3,124,230
PORTABLE CHECK WRITER
Filed March 23, 1961   2 Sheets-Sheet 2
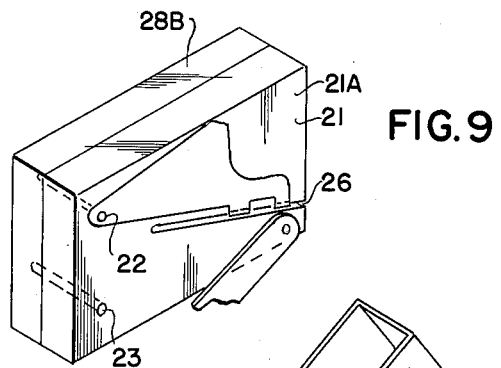
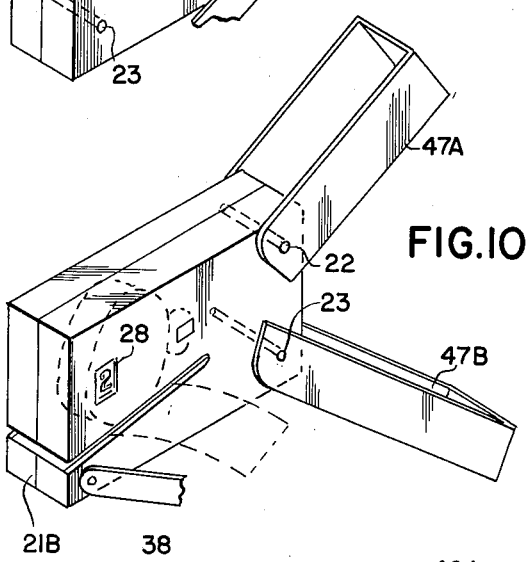
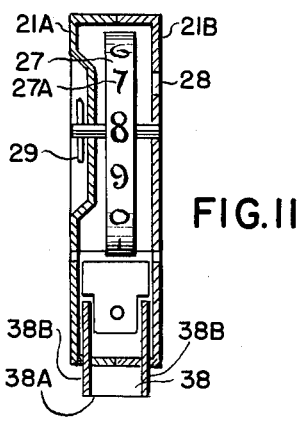
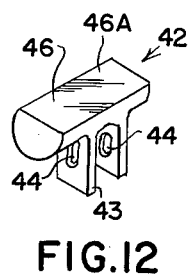
INVENTOR.
Cesar Bustamante
BY *Irving Seidman*
ATTORNEY

3,124,230
PORTABLE CHECK WRITER
Cesar Bustamante, 150 W. 21st St., New York, N.Y.
Filed Mar. 23, 1961, Ser. No. 97,909
3 Claims. (Cl. 197—45)

This invention relates in general to a check writer, and more particularly, to a compact, portable, pocket size check writer.

An object of this invention is to provide for a relatively compact, simply constructed, mechanical check writer that is relatively inexpensive to make and that is positive in operation.

Another object is to provide a check writer capable of printing checks of any multiple digit amount with but a single digital printing wheel.

A feature of this invention resides in the provision that the check writer is formed of a minimum number of parts that can be readily assembled with little, if any, difficulty.

Another feature of this invention resides in the manner in which the check to be printed is progressively fed and successively printed, all in the same motion.

Still another feature resides in the provision of a housing constructed and arranged to form an enclosure for compactly stowing the check writer in the inoperative position thereof, and in the operative position thereof the housing opens to form a handle by which the check writer may be grasped.

Other features and advantages will become readily apparent from the following disclosure and drawings in which:

FIG. 1 illustrates the check writer of this invention encased within its housing.

FIG. 2 is an end view of FIG. 1, having parts thereof broken away.

FIG. 3 illustrates the check writer with its housing shown in partially open position.

FIG. 4 is a sectional side view of the check writer illustrating the operating mechanism thereof.

FIG. 5 is a detail view of the tension plate and spring fingers that cooperate with the feed rollers for securing a blank check in position to be printed.

FIG. 6 is an end view of FIG. 5.

FIG. 7 is a section view taken along line 7—7 of FIG. 4 illustrating the parts in position for actuating the feed rollers.

FIG. 8 is a section view illustrating the parts of FIG. 7 in check printing position.

FIG. 9 is a perspective view of the check writer with the housing removed.

FIG. 10 is a side view of the check writer illustrated in its fully operative position.

FIG. 11 is a sectional end view taken along line 11—11 of FIG. 4.

FIG. 12 is a detail perspective view of the pressure plate.

Referring to the drawing, the check writer 20 in accordance with this invention comprises a casing 21 preferably formed of two rectangularly shaped half sections 21A, 21B which are held together by four rivets 22, 23, 24 and 25, or other suitable type fasteners. Extending transversely from one end of the casing 21 is a narrow slot 26 for receiving the check to be printed.

In accordance with this invention there is rotatably mounted within the casing 21 a digital printing wheel 27. The periphery of the wheel 27 is provided with raised indicia 27A circumferentially spaced thereabout. Preferably the raised indicia 27A consist of the ten numerical digits plus any other desirable symbol such as ",", ".", $ etc. Engraved on the side of the wheel are symbols 27B corresponding to the raised indicia 27A spaced about the periphery of the wheel 27.

The side 21B of the casing 21 opposite the engraved side 27B of the wheel 27 is provided with a small window 28 to permit viewing of the engraved symbols 27B. In this manner it can be readily ascertained which indicia 27A is in position to be printed. The selection of the desired indicium 27A and the positioning of the selected indicium in printing position is attained by actuatng the handle 29 connected to the hub of digital wheel 27, to rotate the digital wheel accordingly. Preferably the handle 29 is pivoted to the wheel hub so that when not in use it may lie flat against the outer surface of the casing 21. The casing may be provided with a depression to accommodate the handle so that the handle need not extend beyond the plane of the casing wall.

In accordance with this invention the wheel 27 is positioned so that its peripheral edge is disposed substantially tangent to the longitudinal axis of the slot 26.

Means for maintaining the periphery of the wheel 27 inked includes an inking wheel 30 disposed in rolling engagement with the digital wheel 27. The inking wheel 30, it will be understood, will be formed with a felt edge or of other suitable ink retaining material so that printing ink may be retained thereon for a considerable amount of time without drying. As shown the inking wheel 30 is normally urged in engagement with the printing wheel 27 by a spring bracket 31 that is fulcrumed about rivet 22. Reinking of the inking wheel 30, as rendered necessary, is accomplished through a suitable opening or window 32 provided in the casing section 21B adjacent the inking wheel 30 for that purpose.

To enable the single digital printing wheel 27 to print checks with multiple digit amounts, means are provided for feeding and successively advancing the check a given amount upon the printing of each digit.

In accordance with this invention the means for feeding the check includes a shaft 33 which is rotatably journaled in the ends of the casing 21, as shown; and it extends transversely thereof substantially parallel to the axis of slot 26. Mounted in spaced relationship on the shaft opposite the digital wheel 27 are a pair of feed rollers 34. Preferably the periphery of the feed rollers 34 are disposed substantially tangent to the axis of the slot and they may be knurled or otherwise formed with a non-slip surface.

Mounted also on the shaft are cooperating ratchet members 35 and 36. One of the ratchet members 35 is fixed to the shaft 33 to rotate therewith. The other ratchet member 36 is loosely mounted on shaft 33 and thus is free to idle or rotate relative thereto. Disposed about the shaft 33 is a coil spring 37 for normally biasing the ratchet members 35, 36 into driving relationship. As shown in FIGS. 7 and 8, the idler ratchet member 36 is provided with an external gear sector 36A and a flat sector 36B.

Operation of the feed rollers 34 is attained by an actuating lever 38 having one end thereof fulcrumed about rivet 25. As shown, the lever 38 is channel shaped with the web 38A of the channel being equal to substantially the width of the casing and is arranged to form the bottom of the casing 21 in the stowed position thereof. A flat spring or spring leaf 39 fulcrumed at rivet 23 exerts a bias on lever 38, and normally urges the lever 38 toward inoperative position. Connected to the other end of the lever 38 is a laterally extending rack 40 having gear teeth 40A in meshing relationship with the gear sector 36A of the idler ratchet member 36. Thus from the structure described it will be apparent that actuation of the lever 38 against the bias of spring 39 and toward the casing 21 will effect the idler ratchet 36 to drive the fixed ratchet 35 and thereby effect rotation of shaft 33 and connected feed rollers 34. Upon the return of the lever 38 to inoperative position under the action of spring 39, the coil spring 37 permits the serration of idler ratchet 36 to drop behind the serrations of the fixed ratchet 35 and thus prevents reverse rotation of the feed rollers 34.

To insure a positive feed of the check during the feeding step, means are provided to frictionally maintain the check under proper tension against the feed rollers 34. According to this invention the check tension means includes a tension plate 41 pivotally mounted on the outer side 21A of the casing 21 by having one end thereof fulcrumed about pivot 22. Integrally formed with the plate 41 are a pair of laterally extending spring fingers 41A which are adapted to project into the slot 26. The arrangement is such that pivoting tension plate 41 in one direction will move the spring fingers 41A into operative position where they are urged against the periphery of the feed rollers 34 and cooperate therewith for securing the check therebetween under the proper tension. Pivoting the tension plate 41 in the opposite direction will move the spring fingers 41A away from the feed rollers 34 and thereby release the tension on the check therebetween so that the check can be readily removed after printing.

To secure the tension plate 41 in operative position, the plate 41 is provided with a small latch 41B which is arranged to engage a suitable latch hole formed in the casing. Thus with a relative small simple movement, the tension plate 41 may be actuated for either applying or releasing the check holding tension.

Printing of the check is accomplished through the action of a pressure plate 42 which is connected intermediate the ends of the actuator lever 38, and arranged so that it is disposed between the feed rollers 34 directly opposite the digital printing wheel 27. As shown in FIG. 12, the pressure plate 42 consists of a T-shaped block having a bifurcated stem portion 43 provided with an elongated slot 44. The arrangement is such that the pressure plate 42 is connected between the legs 38B of the channel shaped lever by means of a pin 45 extended through the slots 44 in stem 43. The cross-head 46 part of the T-shaped pressure plate 42 is arranged to overhang the upright legs 38B. If desired the face 46A of the pressure plate and the raised indicia on the printing wheel 27 may be formed with cooperating serrations to provide character for the printed numerals.

A feature of this invention resides in a housing 47 for stowing the check writer when not in use. According to this invention the housing 47 consists of two half sections 47A and 47B, each of which is pivoted about rivets 22 and 23 respectively for movement between operative position and inoperative position. The housing sections 47A, 47B are sized to enclose the entire casing 21 and a suitable latch means may be provided to maintain the sections 47A, 47B stowed. As shown, each housing section 47A, 47B is provided with a notched-out portion 48, 49 adjacent the point of pivot to permit the respective sections to be rotated about adjacent corner of the casing 21. In the operative or unstowed position of the check writer, the housing sections 47A, 47B function as a handle by which the check writer may be grasped to facilitate the operation thereof.

The operation of the check writer is as follows:

The housing sections 47A, 47B are unlatched and rotated to handle forming position (FIG. 10). When this occurs the spring 39 urges the actuating lever 38 to inoperative position. In this position the check to be printed is placed into the slot 26 to approximately the position in which the numerals or amount of the check are to be printed. With the check in position the tension plate 41 is pivoted and locked in operative position so that its friction fingers 41A are firmly applied to exert the necessary tension to permit the feed rollers 34 to advance the check upon actuation thereof.

The arrangement of the pressure plate 42 with respect to the actuator lever 38 is such that on the initial movement of the lever 38 the pin to slot connection 44, 45 permits a lost motion to occur therebetween and this renders the pressure plate 42 ineffective until the check is properly positioned. During the period that the pressure plate 42 is rendered ineffective, the rack 40 in meshing relationship with the idle ratchet member 36 effects operation of the feed rollers 34 to advance the check into printing position upon actuation of the operating lever. As the flat 40B of the rack 40 engages the flat 36B of the idler ratchet 36, on continued movement of the lever 38, the action of the feed rollers 34 is ceased. This is because the rack 40 then slips or slides past the flat 36B of the idler 36. When this occurs the legs 38B of the lever 38 will engage the cross-head 46 of the pressure plate on the follow-through to lift the same for pressing the check into printing engagement with the printing wheel 27.

Upon release of the lever 38, the spring 39 returns the lever 38 toward its initial inoperative position, thereby returning the pressure plate 42 and rack 40 to normal inoperative position. The digital wheel 27, if necessary, is then reset to the next indicium to be printed. Thus upon actuation of the lever 38, the printing operation is repeated with the feed rollers 34 first automatically advancing the check one space and then printing the next impression on the follow-through of the operating lever 38.

When the entire amount has been printed, the tension plate 41 is released and the printed check removed from the slot. The housing sections 47A, 47B may then be rotated to enclose the check writer casing, and the entire writer may then be placed in one's pocket or stowed until its next use is required.

From the foregoing description it will be noted that the check writer is relatively simple in construction, positive in operation and relatively inexpensive to manufacture. Its entire construction is directed to its manufacture with a minimum of tooling.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

1. A portable pocket size check writer comprising a casing having a slot therein adapted to receive the blank check to be printed, a single digital printing wheel rotatably mounted in said casing so that the periphery of said digital wheel is disposed adjacent to said slot, an inking wheel mounted in said casing in rolling engagement with said digital wheel, means for feeding said check into said slot a predetermined amount, said feeding means including a shaft journalled to the ends of said casing, a feed roller connected to said shaft adjacent to said digital wheel, and means cooperating with said feed roller for releasably gripping the check therebetween for feeding said check; said gripping means including a plate pivotally conected to said casing and said plate having a spring finger extending into said slot adjacent said feed roller, a pair of cooperating ratchet members mounted on said shaft, one of said ratchet members being connected to said shaft to rotate therewith, and the other ratchet member being connected for relative rotation with said shaft, said rotatable member having an external gear sector, a coil spring normally urging said members into driving relationship, an actuator lever pivotally mounted to said casing, a gear rack connected to said lever for engagement with said gear sector of said rotatable ratchet member, a pressure plate connected to said lever intermediate the ends thereof, said pressure plate being disposed opposite said printing wheel and adapted to urge said check into printing engagement with said printing wheel upon the actuation of said lever.

2. A portable pocket size check writer comprising a casing having a slot therein adapted to receive the blank check to be printed, a digital wheel rotatably mounted in said casing so that the periphery of said digital wheel is disposed adjacent to said slot, said digital wheel having raised indicia spaced about the periphery thereof, an inking wheel mounted in said casing in rolling engagement with said digital wheel for inking said indicia, means for frictionally feeding said check into said slot, said feeding means including a shaft journalled to the end of said casing, said shaft extending substantially parallel to said slot, a feed roller disposed on said shaft opposite said digital wheel, means opposite said feed roller and cooperating therewith for frictionally maintaining a check therebetween, a pair of cooperating ratchet members mounted on said shaft, one of said ratchet members being fixed to said shaft to rotate therewith, and the other ratchet member being rotatably mounted relative to said shaft, said rotatably mounted ratchet member having an external gear sector, a coil spring normally urging said ratchet members into driving relationship, an actuator lever pivotally mounted to said casing, a rack connected to the free end of said lever for engagement with said gear sector of said rotatably mounted ratchet boss, a spring normally urging said lever toward inoperative position, and a T-shaped pressure plate connected to said lever intermediate the ends thereof, said pressure plate being disposed opposite said digital wheel and adapted to urge said check into pivoting engagement with said printing wheel upon actuation of said lever, said pressure plate being connected to said lever by a pin and slot connection to provide for a limited amount of lost motion between said lever and said pressure plate upon actuation of said lever whereby said feed rollers first position said check followed by said pressure plate pressing said check against said digital wheel for printing the same.

3. A portable pocket size check writer comprising a casing having a slot therein adapted to receive the blank check to be presented, a digital wheel rotatably mounted in said casing so that the periphery of said digital wheel is disposed adjacent to said slot, said digital wheel having raised indicia spaced about the periphery thereof, an inking wheel mounted in said casing in rolling engagement with said digital wheel for inking said indicia, means for frictionally feeding said check into said slot, said feeding means including a shaft journalled to the end of said casing, said shaft extending substantially parallel to said slot, a pair of feed rollers spatially disposed on said shaft opposite said digital wheel, a spring plate pivoted to said casing, said spring plate having a finger disposed opposite each of said feed rollers to cooperate with its respective feed roller to frictionally secure a check therebetween, a pair of cooperating ratchet members mounted on said shaft, one of said ratchet members being fixed to said shaft to rotate therewith, and the other ratchet member being rotatable relative to said shaft, said rotatable disc having an external gear sector, a coil spring normally urging said discs into driving relationship, an actuator lever pivotally mounted to said casing, a gear rack connected to the free end of said lever for engagement with the gear sector of said ratchet member, a spring normally urging said lever toward inoperative position, and a pressure plate connected to said lever intermediate the ends thereof, said pressure plate being disposed between said feed rollers, said feed roller being adapted to urge said check into printing engagement with said printing wheel upon actuation of said lever, said pressure plate being connected to said lever by a pin and slot connection to provide for a limited amount of lost motion between said lever and said pressure plate connected thereto upon actuation thereof so that said feed roller can properly postion said check prior to printing same.

References Cited in the file of this patent

UNITED STATES PATENTS

| | | |
|---|---|---|
| 1,244,011 | Anderson | Oct. 23, 1917 |
| 1,316,414 | Von Brethort et al. | Sept. 16, 1919 |
| 1,335,201 | Simms | Mar. 30, 1920 |
| 2,570,412 | Vogel | Oct. 9, 1951 |
| 2,714,249 | Clark et al. | Aug. 2, 1955 |